United States Patent
Lin et al.

(10) Patent No.: US 10,780,688 B2
(45) Date of Patent: Sep. 22, 2020

(54) HIGHLY WRINKLED METAL THIN FILMS USING LIFT-OFF LAYERS

(71) Applicant: The Regents of the University of California, Oakland, CA (US)

(72) Inventors: Lancy Lin, Irvine, CA (US); Michelle Khine, Irvine, CA (US); Sun-Jun Park, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 223 days.

(21) Appl. No.: 15/436,324

(22) Filed: Feb. 17, 2017

(65) Prior Publication Data

US 2017/0232725 A1 Aug. 17, 2017

Related U.S. Application Data

(60) Provisional application No. 62/296,361, filed on Feb. 17, 2016.

(51) Int. Cl.
| | |
|---|---|
| *B32B 38/10* | (2006.01) |
| *B32B 37/14* | (2006.01) |
| *B32B 27/06* | (2006.01) |
| *B32B 15/08* | (2006.01) |
| *B32B 3/28* | (2006.01) |

(Continued)

(52) U.S. Cl.
CPC .............. *B32B 38/10* (2013.01); *B32B 3/28* (2013.01); *B32B 7/06* (2013.01); *B32B 7/12* (2013.01); *B32B 15/08* (2013.01); *B32B 27/06* (2013.01); *B32B 27/283* (2013.01); *B32B 37/144* (2013.01); *B32B 2250/02* (2013.01); *B32B 2307/202* (2013.01); *B32B 2307/732* (2013.01); *B32B 2307/736* (2013.01); *B32B 2307/748* (2013.01); *B32B 2309/02* (2013.01); *B32B 2309/04* (2013.01); *B32B 2309/105* (2013.01); *B32B 2457/00* (2013.01)

(58) Field of Classification Search
CPC .......... B32B 37/144; B32B 3/28; B32B 7/06; B32B 15/08; B32B 15/082; B32B 15/085; B32B 38/10; B32B 2307/202; B32B 2307/736; B32B 43/006
See application file for complete search history.

(56) References Cited

U.S. PATENT DOCUMENTS

| | | |
|---|---|---|
| 5,079,535 A | 1/1992 | Neuman |
| 2002/0130673 A1 | 9/2002 | Pelrine et al. |

(Continued)

FOREIGN PATENT DOCUMENTS

| | | | |
|---|---|---|---|
| CN | 103219066 A | 7/2013 | |
| WO | WO 2014/066802 A1 | 5/2014 | |
| WO | WO-2015179320 A1 * | 11/2015 | ........... G06L 1/2287 |

OTHER PUBLICATIONS

Fu et al., "Tunable nanowrinkles on shape memory polymer sheets," Adv. Mater. 21, 4472-4476 (Year: 2009).*

(Continued)

*Primary Examiner* — Kregg T Brooks
(74) *Attorney, Agent, or Firm* — Knobbe, Martens, Olson & Bear, LLP

(57) ABSTRACT

Described are fabrication methods of highly wrinkled metal thin films for applications in electronics such as wearable devices, strain sensors, and capacitive sensors.

16 Claims, 5 Drawing Sheets

(51) Int. Cl.
*B32B 27/28* (2006.01)
*B32B 7/06* (2019.01)
*B32B 7/12* (2006.01)

(56) References Cited

U.S. PATENT DOCUMENTS

| | | | |
|---|---|---|---|
| 2005/0080349 A1 | 4/2005 | Okada et al. | |
| 2006/0169989 A1 | 8/2006 | Bhattacharya et al. | |
| 2006/0283262 A1 | 12/2006 | Smits et al. | |
| 2008/0119896 A1 | 5/2008 | Wong et al. | |
| 2011/0137577 A1 | 6/2011 | Chen | |
| 2011/0253288 A1* | 10/2011 | Xie | B29C 59/02 |
| | | | 156/64 |
| 2011/0278040 A1 | 11/2011 | Zhang et al. | |
| 2012/0035508 A1 | 2/2012 | Van Leer | |
| 2012/0086433 A1 | 4/2012 | Cheng et al. | |
| 2012/0121870 A1 | 5/2012 | Toury et al. | |
| 2013/0140611 A1 | 6/2013 | Kim et al. | |
| 2013/0264912 A1 | 10/2013 | Kwon et al. | |
| 2013/0281861 A1 | 10/2013 | Flomerfelt et al. | |
| 2013/0312541 A1 | 11/2013 | Majidi et al. | |
| 2014/0054599 A1 | 2/2014 | Choi et al. | |
| 2014/0290376 A1 | 10/2014 | Rahajandraibe | |
| 2015/0034237 A1 | 2/2015 | Biggs et al. | |
| 2015/0263235 A1 | 9/2015 | Shin et al. | |
| 2015/0294805 A1 | 10/2015 | Hayward et al. | |

OTHER PUBLICATIONS

Bangs Laboratories, Inc., Tech Support Doc 0023, Common Solvents and Non-Solvents of Polystyrene (2018).*

Ausman et al. 2000 "Organic Solvent Dispersions of Single-Walled Carbon Nanotubes: Toward Solutions of Pristine Nanotubes" *J Phys Chem B* 104: 8911-8915.

Bandodkar, A.J., and Wang, J. 2014. "Non-invasive wearable electrochemical sensors: a review" *Trends Biotechnol* 32: 363-371.

Biagiotti, V. et al. 2012 "Probe accessibility effects on the performance of electrochemical biosensors employing DNA monolayers" *Anal. Bioanal. Chem.* 402: 413-421.

Byun I. et al. 2013 "Transfer of thin Au films to polydimethylsiloxane (PDMS) with reliable bonding using (3-mercaptopropyl)trimethoxysilane (MPTMS) as a molecular adhesive" *J Micromech Microeng* 23(8): 1-10.

Chen et al. 1997 "Estimation of central aortic pressure waveform by mathematical transformation of radial tonometry pressure" *Circulation* 95:1827-1836.

Chirinos, J. A. et al. 2011 "Ethnic differences in arterial wave reflections and normative equations for augmentation index" *Hypertension* 57: 1108-1116.

Drelich, J. and Chibowski, E. 2010 "Superhydrophilic and superwetting surfaces: Definition and mechanisms of control" *Langmuir* 26: 18621-18623.

Dumonteil et al. 2006 "Dispersion of carbon nanotubes using organic solvents" *J Nanosci Nanotechnol* 6(5): 1315-1318.

Freschauf, L.R. et al. 2012 "Shrink-induced superhydrophobic and antibacterial surfaces in consumer plastics" *PLoS One* 7: e40987 (in 7 pages).

Gabardo, C. et al. 2013 "Bench-top fabrication of hierarchically structured high surface-area electrodes" *Adv. Funct. Mater.* 23: 3030-3039.

Gabardo, C.M. et al. 2015 "Rapid prototyping of microfluidic devices with integrated wrinkled gold micro-/nano textured electrodes for electrochemical analysis" *Analyst* 140: 5781-5788.

Hauke et al. 2017 "Superwetting and aptamer functionalized shrink-induced high surface area electrochemical sensors" *Biosensors and Bioelectronics* 94: 438-442.

Heikenfeld, J., 2016 "Non-invasive analyte access and sensing through eccrine sweat: challenges and outlook circa 2016" *Electroanalysis* 28: 1242-1249.

Kimmel, D.W. et al. 2012 "Electrochemical sensors and biosensors" *Anal. Chem.* 84: 685-707.

Kohara, K. et al. 2005 "Radial augmentation index: A useful and easily obtainable parameter for vascular aging" *Am J Hypertens* 18: 14-17.

Li et al. 2012 "Dispersion of Carbon Nanotubes in Organic Solvents Initiated by Hydrogen Bonding Interactions" *AIChE Journal* 58: 2997-3002.

Lipomi et al. 2011 "Skin-like pressure and strain sensors based on transparent elastic films of carbon nanotubes" *Nature Nanotechnology* 6: 788-792.

Lubin, A.A. And Plaxco, K.P., 2010 "Folding-based electrochemical biosensors: the case for responsive nucleic acid architectures" *Acc. Chem. Res.* 43: 496-505.

Nelson et al., 2010 "Noninvasive Measurement of Central Vascular Pressures With Arterial Tonometry: Clinical Revival of the Pulse Pressure Waveform?" *Mayo Clin Proc* 85(5): 460-472.

Pegan, J.D. et al. 2013 "Flexible shrink-induced high surface area electrodes for electrochemiluminescent sensing" *Lab Chip* 13: 4205-4209.

Pheeny, C.G. and Barton, J.K. 2012 "DNA electrochemistry with tethered methylene blue" *Langmuir* 28: 7063-7070.

Rowe, A.A. et al. 2010 "Reagentless measurement of aminoglycoside antibiotics in blood serum via an electrochemical, ribonucleic acid aptamer-based biosensor" *Anal. Chem.* 82: 7090-7095.

Salvarezza, R.C. et al. 1990 "Monte Carlo simulation applicable to the growth of rough metal overlayers: parametric relationships related to the electrochemical roughening" *Phys. Rev. B* 41: 502-512.

Schwartz et al. (2013 "Flexible polymer transistors with high pressure sensitivity for application in electronic skin and health monitoring" *Nature Communications* 4: 1859 (in 8 pages).

Setia, U. and Gross, P.A. 1976 "Administration of tobramycin and gentamicin by the intravenous route every 6 h in patients with normal renal function" *J. Infect. Dis.* 134: S125-129.

Sonney, S. et al. 2015 "Rapid bench-top fabrication of poly(dimethylsiloxane), polystyrene microfluidic devices incorporating high-surface area sensing electrodes" *Biomicrofluidics* 9: 026501 (in 11 pages).

Wang et al. 2014 "Silk-Molded Flexible, Ultrasensitive, and Highly Stable Electronic Skin for Monitoring Human Physiological Signals" *Advanced Materials* 26: 1336-1342.

* cited by examiner

HIGHLY WRINKLED METAL THIN FILMS USING LIFT-OFF LAYERS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND OF THE INVENTION

Field of the Invention

This application relates to materials and procedures for fabricating lift-off wrinkled metal thin films. More specifically, the materials and procedures can be used to fabricate sensors and electrodes with higher surface area, broader spectrum of wrinkle sizes, and enhanced mechanical and electrical performance. Examples of applications include wearable electronics, strain sensing, and capacitive sensing with high sensitivity and reliability of acquired data.

Description of the Related Art

Wearable electronics is a rapidly growing, innovative field aiming to integrate personal healthcare with continuous, remote health monitoring. The technology is especially important in countries and regions where healthcare is relatively inaccessible and the ratio of physicians to patients is inefficiently low. A device platform to monitor patient health outside of physician offices will help enable more efficient preventative healthcare and personalized treatments, free up medical resources, and lower healthcare costs. Current devices often consist of bulky, pre-existing electronic components mounted onto the human body that can inhibit patient lifestyles while delivering poor electrical performance.

High surface area wrinkled metal thin films are fabricated by thermally shrinking shape-memory polymers (SMP) patterned with metal, eliciting a stiffness mismatch and causing the metal film to buckle and form high aspect ratio, hierarchical wrinkle structures. Wrinkled thin films are more sensitive than flat films due to a greater number of electrochemically active sites. Their thin profiles and flexibility makes them more capable of conforming to skin, maintaining good contact for longer periods of data collection, and reducing device clutter. Further, they are more scalable to produce compared to fabrication methods that require costly microelectromechanical systems (MEMS) processes and equipment. Thus, these films have a high potential of remediating obtrusive, low sensitivity monitoring systems.

SMPs, e.g., polystyrene, have previously been used to create wrinkled thin metal devices including electrodes, sensors, and stretchable wires. The attainable aspect ratio of the wrinkles may be limited by the approximate 60% top-down area reduction (300% shrink) associated with polystyrene.

SUMMARY OF THE INVENTION

Various embodiments of the wrinkled metal thin films and associated fabrication methods discussed herein seek to create a process that expands a low-cost SMP platform to encompass polymer substrates capable of greater shrinkage and thus producing higher surface area thin films and higher aspect ratio wrinkle features. The highly wrinkled metal thin films are formed using SMPs capable of shrinking by amounts greater than about 300%, e.g., by more than 500%, by more than about 750%, by more than about 1000%, by more than about 2000%, and lift-off layers, and then transferred onto stretchable elastomeric materials. The fabricated films can exhibit higher surface areas and a broader range of wrinkle sizes, which can advantageously increase the sensitivity and strainage thresholds of SMP-fabricated thin film devices. In some embodiments, other electronic components can be packaged separately and interface with the highly wrinkled metal thin films.

In one embodiment, a method is provided for forming a sensor component. The method can include providing a first layer comprising a first polymer. A second layer comprising a second polymer is provided over the first layer. A third layer is formed over the second layer. The third layer comprises a conductor. The first layer and the third layer are shrunken causing the third layer to be wrinkled. A fourth layer comprising a stretchable material is applied to enclose at least one side of the third layer. The third layer and the fourth layer are separated as a unit from the first layer.

In another embodiment, a sensor component assembly is provided. The sensor component assembly comprises a shape memory polymer layer a lift-off layer, a conductive layer, and a stretchable layer. The lift-off layer is disposed on the shape memory polymer layer. The conductive layer can be placed over, e.g., directly on the lift-off layer. The stretchable layer disposed on a side of the conductive layer opposite the lift-off layer. The shape memory polymer layer is capable of being shrunken by an amount sufficient to induce wrinkles in the conductor layer. After the shape polymer layer is shrunk by the desired amount, the lift-off layer is removed. Upon removal of the lift-off layer, the shape memory polymer is also removed resulting in a sensor component assembly comprising the conductive layer and the stretchable layer. The sensor component assembly can be a construct formed during a manufacturing process. The sensor component assembly can be transformed by additional manufacturing processes to form a sensor assembly. For example, the sensor component assembly can be transformed into a strain gauge that is capable of sensing strain rates in the manner described below with reference to FIG. 1. As another example, the sensor component assembly can be transformed into an interconnect that provides a conductive path between two electronic devices.

BRIEF DESCRIPTION OF THE DRAWINGS

These and other features, aspects and advantages are described below with reference to the drawings, which are intended to illustrate but not to limit the inventions. The following is a brief description of each of the drawings.

DETAILED DESCRIPTION OF THE PREFERRED EMBODIMENT

Various embodiments discussed herein are configured to improve the mechanical and electrical properties of wrinkled metal thin films by using highly shrinkable SMPs (e.g., polyolefins) to induce more wrinkle formation. Without subscribing to any particular theory, to isolate the wrinkled metal thin film from the SMP, the SMP is dissolved away using common solvents like acetone. Polyolefins (PO) are relatively resistant to common solvents, thus a lift-off layer susceptible to solvents can be used. The lift-off layer, e.g., poly(methyl methacrylate) (PMMA, 950K A2 resist), can be a dissolved polymer solution suspended in anisole that can be capable of reflowing at the glass transition temperature of the polymer substrate.

Figure 1:
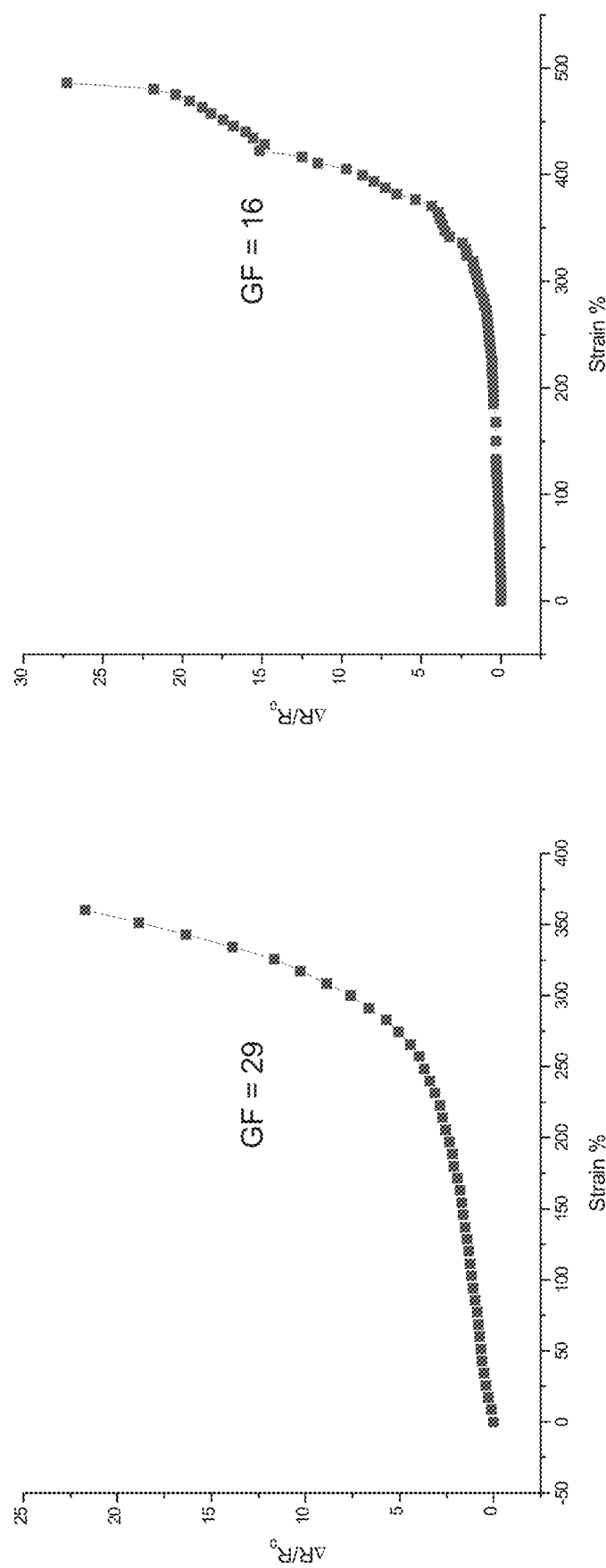
FIG. 1 shows the strain-to-failure data fabricated samples strained at rates of 10% (left) and 5% (right). Gauge factors (GF) represent the upper linear region of each graph.
Figure 2:
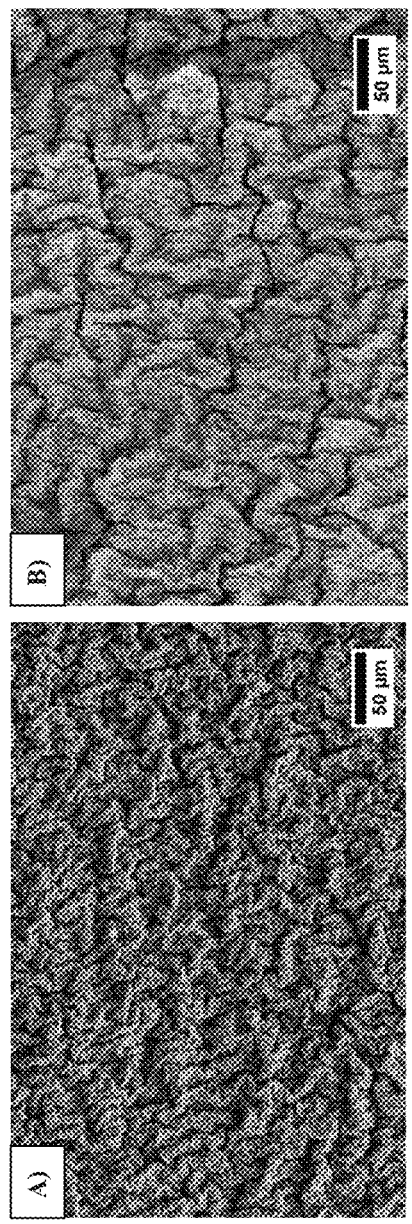
FIG. 2 shows the wrinkle hierarchy formed under A) highly shrinkable SMPs (shrunk by 2000%) compared to that of B) typical SMPs (shrunk by 300%). Both samples were deposited with 15 nm Au.
Figure 2A:
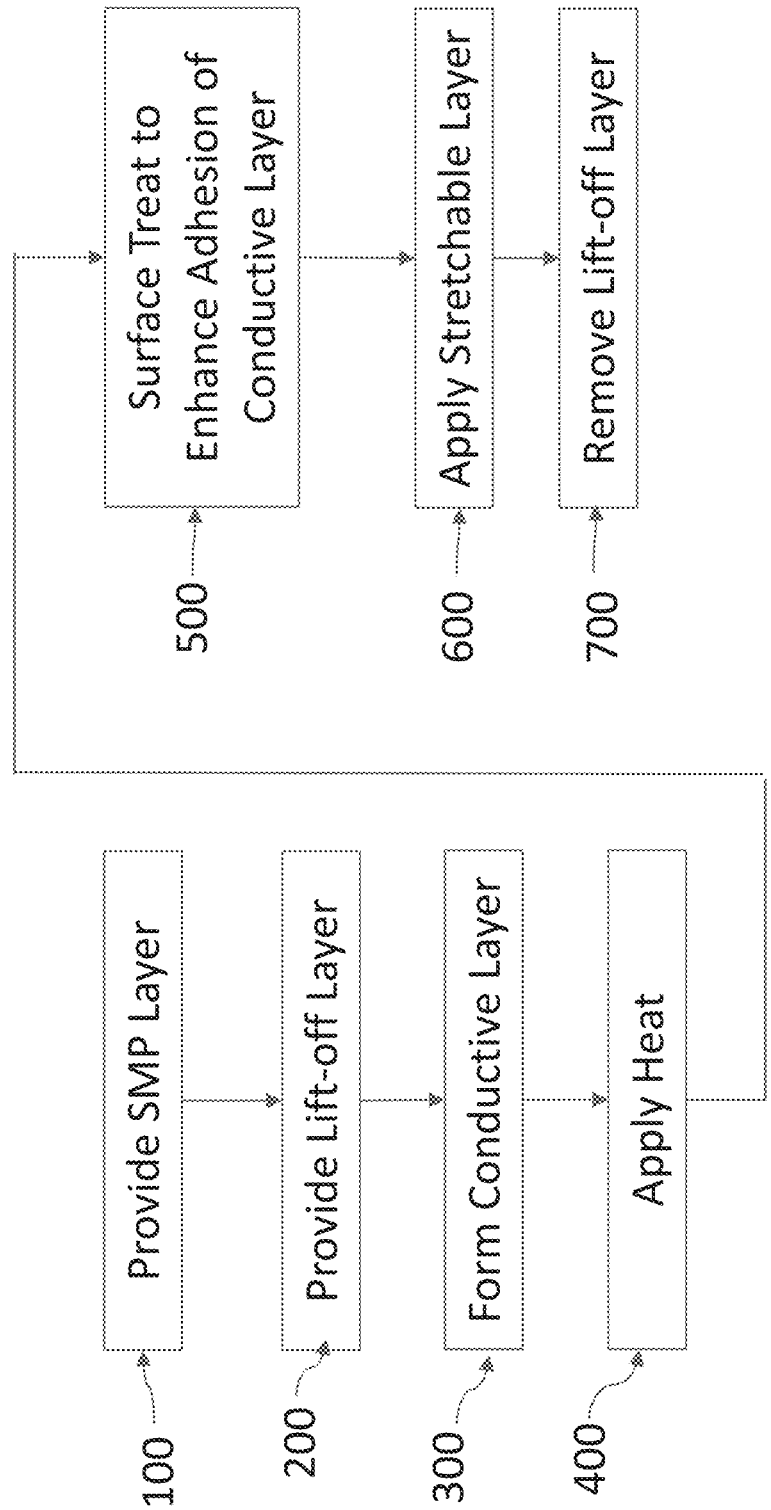
FIG. 2(A) illustrates a method disclosed herein.
Figure 2B:
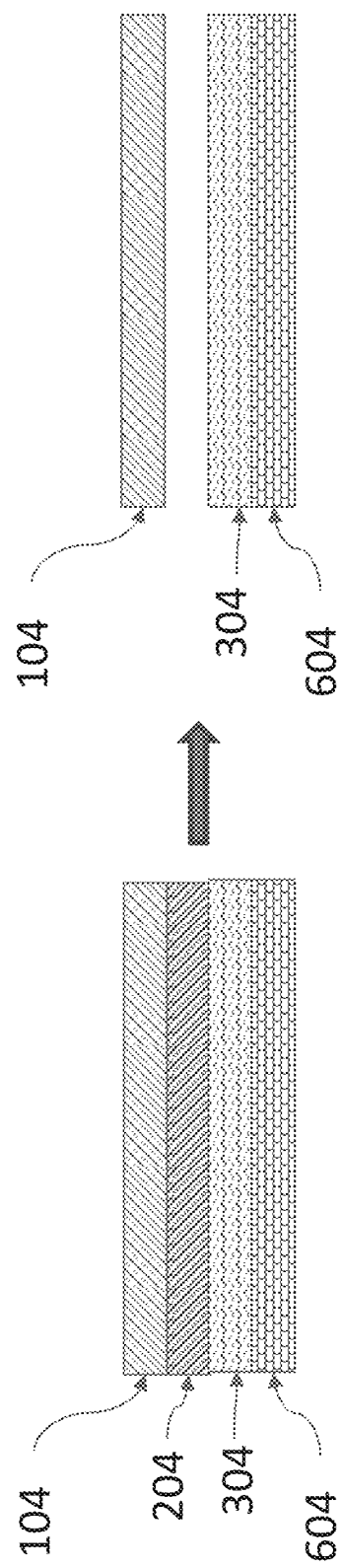
FIG. 2(B) illustrates the method and various sensor component assemblies, which assemblies can be combined with other circuits and components to yield highly sensitive and effective strain gauges such as is illustrated in FIG. 3 and for which test data is shown in FIG. 1.
Figure 3:
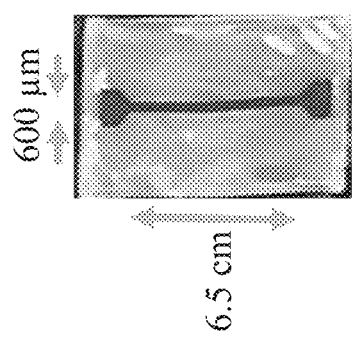
FIG. 3 is an example of a wrinkled metal film straight trace shrunk by 2000%, casted in an elastomeric silicone, and lifted off from a highly shrinkable SMP.

Example Materials and Procedures:

1. In block 100 of a method illustrated in FIG. 2(A), a first layer 104, e.g., a Polymer substrate: PO shrink-wrap film (being about 20 um thick) is provided, e.g., mounted onto a glass slide and secured, e.g., using polyimide tape.
2. In block 200 of the method a second layer 204, e.g., Lift-off polymer layer: PMMA is applied onto the PO surface such that a portion, e.g., at least half of the polyolefin substrate is covered with the polymer solution. The PMMA layer can be thinned to about 100 nm thickness through a two-step spin coating process: 1) 500 rpm spin speed with an acceleration of 500 rpm2 for 10 seconds, and then 2) 100 rpm spin speed with an acceleration of 1040 rpm2 for 40 seconds. Other thicknesses and speeds can be used.
3. In block 300 of the method, a conductor 304, e.g., a Metal thin film can be deposited. A pre-patterned frisket film mask can be attached to the PO+PMMA surface for selective metal deposition. 15 nm of gold (Au) is deposited onto the surface and mask via sputter deposition. The mask is removed, revealing an Au thin film design on the previously exposed regions of the PO+PMMA surface.
4. In block 400 of the method, thermal shrinkage occurs. The deposited PO+PMMA sample can be removed from its glass mount, sandwiched between two parchment paper-lined glass plates that are spaced about 1 mm apart, and is thermally shrunk in a 150° C. toaster oven until flat for about 10 minutes. At this point, the sample has shrunk by a large percentage, e.g., by about 2000% and the Au film has wrinkled due to a stiffness mismatch compared to the shrinking polymer substrate.
5. In block 500 of the method, a surface treatment is provided. The shrunk sample can be immersed in a covered silane bath consisting of (3-mercaptopropyl) trimethoxysilane (MPTMS) diluted in pure ethanol to a concentration of about 5 mmol. After about a 1-hour treatment period, the sample is rinsed with ethanol and dried using an air gun. The silane acts as a molecular glue to enhance the bond between the wrinkled Au thin film and the stretchable silicone elastomeric material.
6. In block 600 of a method, a stretchable material or layer 604, e.g., a silicone elastomer layer is provided. A 1:1 ratio of Smooth-On 00-30 Ecoflex elastomer can be prepared and vacuumed for about 10 minutes to remove air bubbles from mixing. The Ecoflex can be drop-casted to a thickness of 300-400 um onto the entire sample surface. The casted sample is placed in a vacuum chamber for about 20 minutes to remove air trapped between the Au-elastomer interface. The elastomer is then cured in an oven heated to at least about 80° C. for about ≥1 hour. The elastomer can be cured overnight.
7. In block 700 of a method, a wrinkled Au thin film is removed from a polymer substrate. The result is also illustrated in FIG. 2(B) in which the lift-off layer is present to the left of the arrow but is absent to the right of the arrow, such that the conductor 304 and the stretchable layer 604 are separated, e.g., as a unit, from the first layer 104. Lift-off of the Au film can be completed using any suitable method, such as:
   a. The sample is exposed to an abundant, continuous supply of solvent vapor to dissolve away the lift-off layer. In a fume hood, a 25 mL Erlenmeyer flask is filled with 15 mL of acetone. Larger flasks can be used with more acetone. The sample is hung inside the flask, but does not touch the liquid acetone. The flask is then loosely covered with aluminum foil and heated on a hot plate heated to about 95° C. to vaporize the acetone. The sample is exposed to the acetone vapor for 2-2.5 hours, or until the wrinkled Au thin film (adhered to the elastomer) can be easily peeled off the PO substrate. Once removed, the Au+elastomer is immersed in isopropyl alcohol for 20 minutes before being hang-dried overnight.
   b. The sample is heated above the glass transition temperature of the lift-off polymer to "melt" the lift-off layer. The sample is placed on a glass slide elastomer-side down. The glass slide and sample are heated on a hot plate, heated to about 120-140° C., for 7-9 minutes (actual values depend on the hot plate heat efficiency) to induce the reflow state of the lift-off PMMA polymer layer. The wrinkled Au thin film and casted elastomer are peeled away from the PO. Acetone is used to dissolve away any residual PMMA from the wrinkled Au thin film. If acetone is used, the sample can be hang-dried overnight.

Materials and thicknesses of the lift-off polymer, the deposited metal, and silicone elastomer can be modified to fabricate different types of electronic sensors and electrodes. The advantages of this invention include mechanical and electrical robustness under high strain, and greater sensitivity as measured by the gauge factor of the fabricated thin film device. At 10% strain increments, the resulting device can withstand strains greater than 300%. At slower strain rates, the device can withstand strains beyond 400%. Above 150% strain, the gauge factor can reach up to 40 indicating high sensitivity to strain. The fabrication process and materials are low-cost and require relatively small volumes of solvents compared to typical thin film fabrication processes. This invention can be adopted into other fabrication platforms to improve the mechanical and electrical properties of existing thin film devices.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Further, the actions of the disclosed processes and methods may be modified in any manner, including by reordering actions and/or inserting additional actions and/or deleting actions. Thus, it is intended that the scope of at least some of the present inventions herein disclosed should not be limited by the particular disclosed embodiments described above. The limitations in the claims are to be interpreted broadly based on the language employed in the claims and not limited to the examples described in the present specification or during the prosecution of the application, which examples are to be construed as non-exclusive.

What is claimed is:

1. A sensor component assembly comprising:
   a shape memory polymer layer comprising a first polymer;
   a lift-off layer disposed on the shape memory polymer layer, wherein the lift-off layer comprises a material that is different from the first polymer in the shape memory polymer layer; and
   a conductive layer;
   wherein the shape memory polymer layer is capable of being shrunken by an amount sufficient to induce wrinkles in the conductor layer, and
   wherein the lift-off layer comprises a material that is susceptible to dissolution by acetone and the shape memory layer is resistant to dissolution by acetone; or the lift-off layer comprises a material that is susceptible to dissolution by anisole and the shape memory layer is resistant to dissolution by anisole.

2. The sensor component assembly of claim 1, wherein the material in the lift-off layer comprises a second polymer that is different from the first polymer in the shape memory polymer layer.

3. The sensor component assembly of claim 2, wherein the second polymer in the lift-off layer comprises poly (methyl methacrylate).

4. The sensor component assembly of claim 1, wherein the conductive layer comprises a metal.

5. The sensor component assembly of claim 1, further comprising a stretchable layer disposed over a side of the conductive layer opposite the lift-off layer.

6. The sensor component assembly of claim 4, wherein the metal comprises gold.

7. The sensor component assembly of claim 1, wherein the shape memory polymer layer comprises a polyolefin and the lift-off layer comprises poly(methyl methacrylate).

8. The sensor component assembly of claim 1, wherein the lift-off layer has a thickness of about 100 nm.

9. A method of forming a sensor component comprising:
   obtaining the sensor component assembly of claim 1,
   shrinking the sensor component assembly by baking beyond a glass transition temperature of the shape memory polymer, wherein the conductive layer becomes wrinkled,
   coating a stretchable layer on the conductive layer, opposite the lift-off layer, and removing the lift-off layer,
   wherein the sensor component comprises the wrinkled conductive layer and the stretchable layer.

10. The method of claim 9, wherein the conductive layer comprises gold.

11. The method of claim 9, wherein the stretchable layer comprises a silicone layer.

12. The method of claim 11, wherein the silicone layer comprises a thickness of 100-1000 μm.

13. The method of claim 9, further comprising, prior to coating the stretchable layer on the conductive layer, treating a surface of the conductive layer to enhance adhesion thereof to the stretchable layer.

14. The method of claim 9, wherein the material in the lift-off layer comprises a second polymer that is different from the first polymer in the shape memory polymer layer, and wherein removing the lift-off layer comprises exposing the second polymer of the lift-off layer to a solvent to dissolve away the second polymer.

15. The method of claim 14, wherein the solvent is in a vapor state.

16. The method of claim 14, wherein the solvent is acetone.

* * * * *